United States Patent [19]
Demongin

[11] Patent Number: 5,620,192
[45] Date of Patent: Apr. 15, 1997

[54] VEHICLE SUPPORT SYSTEM

[76] Inventor: Louis Demongin, 17205 Chicago Ave., Yorba Linda, Calif. 98626

[21] Appl. No.: 590,702

[22] Filed: Jan. 29, 1996

Related U.S. Application Data

[63] Continuation of Ser. No. 463,021, Jun. 5, 1995, abandoned, which is a continuation-in-part of Ser. No. 310,758, Sep. 26, 1994, abandoned.

[51] Int. Cl.$^6$ ..................................................... B60S 9/00
[52] U.S. Cl. .......................... 280/35; 280/79.4; 248/582
[58] Field of Search ................... 280/79.3, 79.4, 280/79.7, 79.11, 35, 42, 638, 43.21, 47.15, 764.1, 761, 414.1; 410/87; 248/632, 292.13, 188.2, 635, 582, 596

[56] References Cited

U.S. PATENT DOCUMENTS

| | | | |
|---|---|---|---|
| 135,974 | 2/1873 | Doremus | 248/582 |
| 863,122 | 8/1907 | Weber | 280/79.4 |
| 968,316 | 8/1910 | Beckert | 280/79.11 |
| 1,288,057 | 12/1918 | Larson | 280/47.15 |
| 2,246,882 | 6/1941 | Gentry | 280/79.4 |
| 2,247,717 | 7/1941 | Sutter | 414/430 |
| 2,350,118 | 5/1944 | Knapp | 414/430 |
| 2,472,952 | 6/1949 | Lennard | 280/79.11 |
| 2,816,672 | 12/1957 | Facchini | 280/414.1 |
| 2,830,828 | 4/1958 | Flanagan | 280/414.1 |
| 2,895,160 | 7/1959 | Clifton | 280/79.11 |
| 3,066,946 | 12/1962 | Nelson | 280/79.11 |
| 3,379,314 | 4/1968 | Canning | 280/414.1 |
| 3,982,768 | 9/1976 | Getman | 280/79.11 |
| 4,060,258 | 11/1977 | Pigeon | 280/638 |
| 4,094,527 | 6/1978 | Miller | 280/414.1 |
| 4,784,402 | 11/1988 | Roman | 280/79.4 |
| 4,801,152 | 1/1989 | Elliot et al. | 280/79.11 |
| 4,934,720 | 6/1990 | Dobron | 280/79.11 |
| 4,976,449 | 12/1990 | Lotspeich et al. | 280/79.4 |
| 5,039,123 | 8/1991 | Smeitink | 280/79.4 |
| 5,112,070 | 5/1992 | Hahn | 280/79.4 |
| 5,161,932 | 11/1992 | Johnson | 280/79.4 |
| 5,249,907 | 10/1993 | Poten et al. | 280/79.4 |

FOREIGN PATENT DOCUMENTS

| | | | |
|---|---|---|---|
| 672197 | 10/1963 | Canada | 280/79.4 |
| 2022525 | 11/1971 | Germany | 248/582 |

*Primary Examiner*—Anne Marie Boehler
*Attorney, Agent, or Firm*—Robert T. Spaulding

[57] ABSTRACT

A Vehicle Support System comprising a plurality of dollies joined by a common axle. Each dolly sets upon a pair of tandem mounted castors which are free to rotate and pivot in any direction. In addition, at least one castor on each dolly is equipped with a castor brake. Each dolly further comprises a clevis which accepts the support point of the vehicle. Upon installation, the Vehicle Support System allows the vehicle to be moved about to a suitable location and then, by means of the castor brakes, fixed at that location.

3 Claims, 2 Drawing Sheets

VEHICLE SUPPORT SYSTEM

This application is a continuation of U.S. patent application Ser. No. 08/463,021, filed Jun. 5, 1995, now abandoned, which is a continuation-in-part of application Ser. No. 08/310,758, filed Sep. 26, 1994, now abandoned.

BACKGROUND OF THE INVENTION

1. Field of the invention

This invention relates generally to automobile dollies and more specifically to a vehicle support system that, upon installation, allows the supported vehicle to be manipulated in any direction. When the vehicle has been suitably located, the support system may be locked in place, preventing any further movement of the vehicle.

2. Description of the Prior Art

Automobile dollies and trucks are well known in the art, for example, U.S. Pat. No. 2,350,118, U.S. Pat. No. 3,066,946 U.S. Pat. No. 4,060,258, and U.S. Pat. No. 4,976,449. However, none of these patents show a combination of two dollies which may be spaced at any convenient distance on a common axle and then locked in place. Further, none of these devices allow the removal of wheels from the vehicle.

Accordingly, one object and advantage of this invention is to provide dollies that may be conveniently spaced under a vehicle and then locked into position on a common axle.

Another object and advantage of this invention is that the castors of the dollies may be locked in place.

Another object and advantage of this invention is that the support system permits the wheels to be removed from the supported vehicle.

Further objects and advantages of this invention will become apparent from consideration of the drawings and ensuing description of it.

SUMMARY OF THE INVENTION

The present invention comprises two dollies mounted on a common axle. In turn, each dolly is comprised of a rigid body structure, henceforth called the chassis, dimensioned to accommodate two castors which are mounted in tandem to the bottom surface of the chassis. Each castor is free to rotate and pivot in any direction, but at least one castor is equipped with a brake, henceforth called the castor brake, which, when activated, will prevent movement of the dolly.

Located midway between the two castors and on each side of the chassis is an aperture of sufficient diameter to allow passage of the axle. Further, a locking collar, also of sufficient diameter to allow passage of the axle, is mounted on each side of the chassis in coaxial alignment with the apertures. Each collar is provided with a locking device to prevent movement of the dolly on the axle.

Also located midway between the two castors and on each side of the chassis above the previously mentioned aperture is another aperture of sufficient diameter to allow passage of a clevis pin which mounts a clevis to the chassis. The clevis is U-shaped and is dimensioned to clear the sides of the chassis. The top of the clevis is covered with a resilient material, henceforth called the clevis pad, which increases the friction between the clevis and the point of contact with the vehicle that is being supported. The clevis is free to pivot, but the pivoting motion is limited in scope and dampened in intensity by a plurality of compressible pads which are mounted on the top surface of the chassis.

To use the support system the subject vehicle is elevated to a convenient height and a suitable location for the dollies is selected. This may be the axles of the vehicle or a frame member. The two dollies, which have been mounted on their common axle, are then placed under the vehicle so that the top of the clevis will come into contact with the selected location of the vehicle. The vehicle may then be lowered into position with clearance under the wheels and any jacks or hoists removed. Any irregularities in the two mounting positions will be accommodated by the ability of the clevis to pivot, and any tendency for the vehicle to slide off the clevis will be inhibited by the clevis pad.

Since the castors are free to pivot in any direction, the vehicle may now be moved about a work area until a convenient location is found. Then, the castor brakes may be set to prevent any further movement of the vehicle. Thus it may be seen that the Vehicle Support System allows the movement of a disabled vehicle about a shop area without the need for jacks or hoists. The wheels and other undercarriage components may then be conveniently removed and replaced as required.

DESCRIPTION OF THE PREFERRED EMBODIMENT

Figure 1:
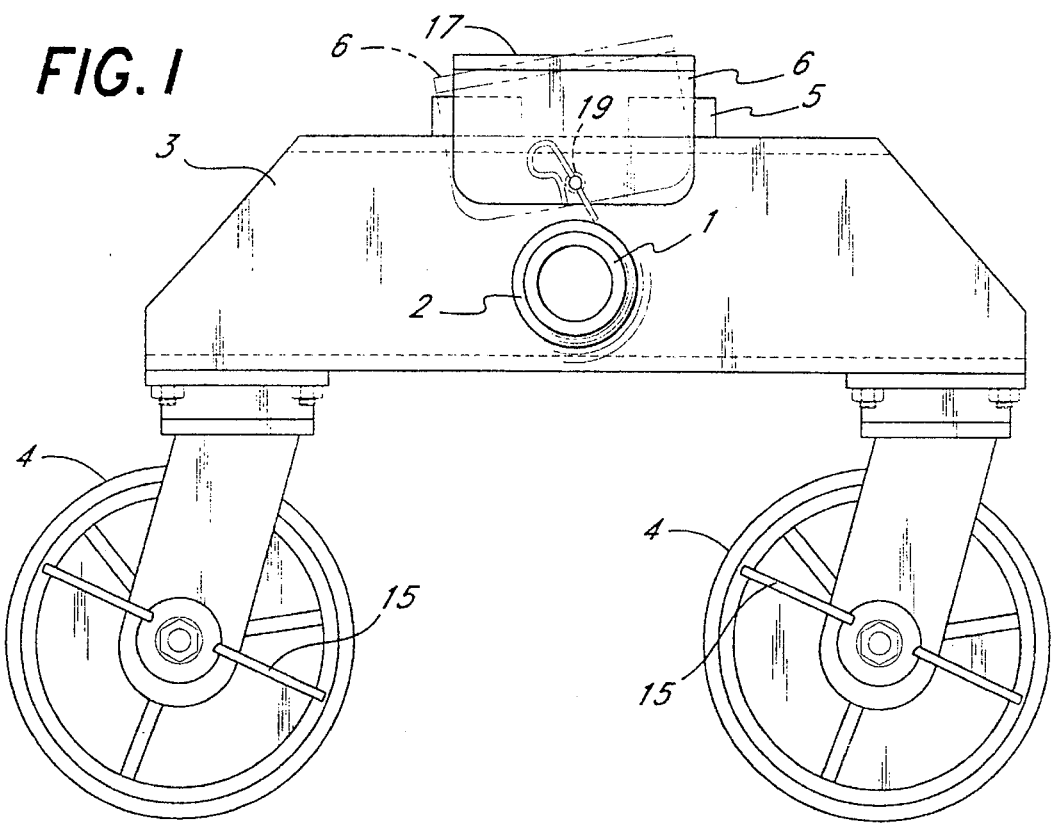
FIG. 1 shows a side view of one of the dollies. In this view, the relationship between the chassis 3, the castors 4, and the clevis 6 may be clearly seen.

FIG. 1 shows a typical dolly in which the castors 4 are mounted in tandem to the chassis 3. In this view, the relationship between the chassis 3, the aperture in the chassis 19, the clevis pin 11, the clevis pad 17 and the clevis 6 can be seen. The dashed outline of the clevis 6 defines the limit of travel, showing how it abuts against a compressible pad 5.

Figure 2:
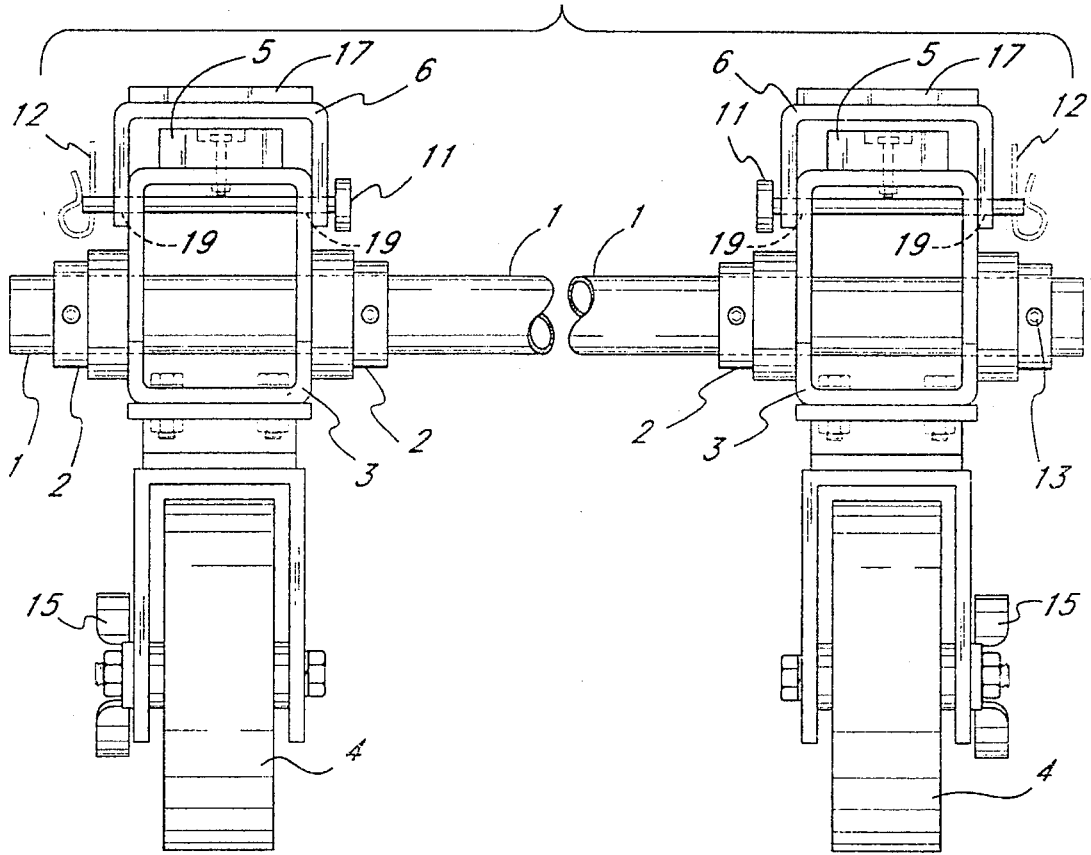
FIG. 2 shows the front view of the vehicle support system which shows the relationship between the two dollies and the axle 1.

FIG. 2 is a frontal view of the complete system, which is comprised of two dollies and a common axle, 1. Each dolly may be positioned laterally on the axle that passes through a locking collar 2, through the two apertures in the sides of the chassis 3, and through another locking collar. The axle may then be locked in place with suitably located set screws 13.

Figure 3:
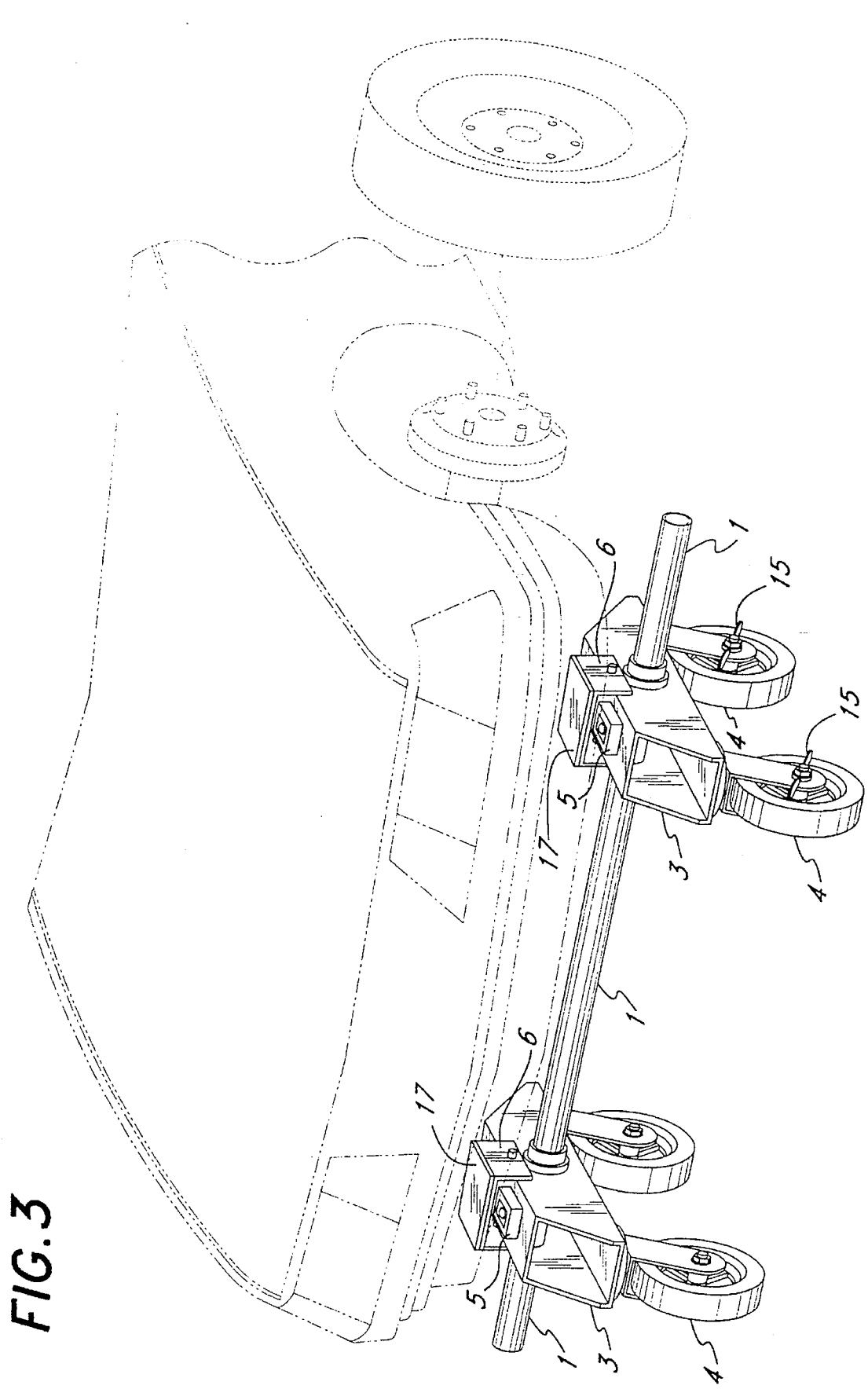
FIG. 3 shows a perspective view of the vehicle support system located under a vehicle.

FIG. 3 shows a perspective view of the vehicle support system with a vehicle mounted on the clevis pads. This view demonstrates how a wheel may be removed from the vehicle without hampering its mobility. That is, the vehicle can be moved about and directed through the versatility of the pivoting castors 4. When a suitable location for the vehicle is reached, this location can be fixed by setting the castor brakes 15.

Based on the description of FIGS. 1, 2, and 3, it can be seen that this invention provides dollies that may be conveniently spaced under a vehicle and then locked into position on a common axle. Further, the castors located on the dollies may be locked to provide a fixed work station.

Although the description above contains many specifications, these should not be construed as limiting the scope of the invention, but as merely providing illustrations of some of the presently preferred embodiments of this invention. Thus the scope of the invention should be determined by the appended claims and their legal equivalents, rather than by the examples given.

What is claimed is:

1. A vehicle support system comprising two dollies which are laterally positioned on a common axle and four locking collars which are mounted on the common axle and abut one against each side of a dolly through which the common axle passes, each dolly comprising:

a chassis including two pivoting castors that are mounted in tandem to the chassis, allowing the vehicle support system to be moved about, a clevis, located on the chassis opposite the castors and secured to the chassis with a clevis pin which allows the clevis to pivot, two compressible pads, positioned on the chassis to define the limits of travel through which the clevis may pivot, and an aperture on each side of the chassis through which the common axle passes.

2. A vehicle support system of claim 1, further comprising a clevis pad which is mounted to the top of the clevis.

3. A vehicle support system of claim 2, in which at least one castor is equipped with braking means.

* * * * *